United States Patent
Morin et al.

(10) Patent No.: US 7,810,157 B2
(45) Date of Patent: Oct. 5, 2010

(54) METHOD OF MANAGING ALERTS ISSUED BY INTRUSION DETECTION SENSORS OF AN INFORMATION SECURITY SYSTEM

(75) Inventors: Benjamin Morin, Rennes (FR); Hervé Debar, Louvigny (FR)

(73) Assignee: France Telecom, Paris (FR)

( * ) Notice: Subject to any disclaimer, the term of this patent is extended or adjusted under 35 U.S.C. 154(b) by 147 days.

(21) Appl. No.: 10/583,586

(22) PCT Filed: Dec. 16, 2004

(86) PCT No.: PCT/FR2004/003252

§ 371 (c)(1), (2), (4) Date: Jun. 19, 2006

(87) PCT Pub. No.: WO2005/060205

PCT Pub. Date: Jun. 30, 2005

(65) Prior Publication Data

US 2007/0150579 A1    Jun. 28, 2007

(30) Foreign Application Priority Data

Dec. 17, 2003   (FR) .................................. 03 14833

(51) Int. Cl.
| G06F 11/00 | (2006.01) |
| G08B 23/00 | (2006.01) |
| H04L 29/06 | (2006.01) |
| G06F 11/30 | (2006.01) |
| G06F 15/177 | (2006.01) |

(52) U.S. Cl. .................... 726/23; 726/22; 726/24; 726/25; 713/150; 713/166; 713/188; 709/223; 709/224

(58) Field of Classification Search ............. 726/22–25; 709/223–224; 713/150, 166, 188
See application file for complete search history.

(56) References Cited

U.S. PATENT DOCUMENTS 6,393,386 B1 * 5/2002 Zager et al. ................... 703/25

(Continued)

FOREIGN PATENT DOCUMENTS

| EP | 0 735 477 A | 10/1996 |
| EP | 1 146 689 A | 1/2001 |

OTHER PUBLICATIONS

Julisch, Klaus, "Clustering Intrusion Detection Alarms to Support Root Cause Analysis," Nov. 2003, ACM Transacdtions on Information and System Security, vol. 6, No. 4, pp. 443-471.*

(Continued)

Primary Examiner—William R Korzuch
Assistant Examiner—Trang Doan
(74) Attorney, Agent, or Firm—Cohen Pontani Lieberman & Pavane LLP

(57) ABSTRACT

A method of managing alerts issued by intrusion detection sensors (11a, 11b, 11c) of an information security system (1) including an alert management system (13), each alert being defined by an alert identifier and an alert content. Each of the alerts issued by the intrusion detection sensors (11a, 11b, 11c) is associated with a description including a conjunction of valued attributes belonging to attribute domains. The valued attributes belonging to each attribute domain are organized into a taxonomic structure defining generalization relationships between said valued attributes, the plurality of attribute domains thus forming a plurality of taxonomic structures. The description of each of said alerts is completed with sets of values induced by the taxonomic structures on the basis of the valued attributes of said alerts to form complete alerts. The complete alerts are stored in a logic file system (21) to enable them to be consulted.

11 Claims, 3 Drawing Sheets

U.S. PATENT DOCUMENTS

| | | | | |
|---|---|---|---|---|
| 6,445,774 | B1* | 9/2002 | Kidder et al. | 379/9.03 |
| 6,647,400 | B1* | 11/2003 | Moran | 707/205 |
| 6,707,795 | B1* | 3/2004 | Noorhosseini et al. | 370/242 |
| 6,732,153 | B1* | 5/2004 | Jakobson et al. | 709/206 |
| 6,801,940 | B1* | 10/2004 | Moran et al. | 709/224 |
| 7,026,926 | B1* | 4/2006 | Walker, III | 340/539.11 |
| 7,203,962 | B1* | 4/2007 | Moran | 726/23 |
| 7,437,762 | B2* | 10/2008 | Dacier et al. | 726/25 |
| 2002/0059078 | A1* | 5/2002 | Valdes et al. | 705/1 |
| 2002/0087882 | A1* | 7/2002 | Schneier et al. | 713/201 |
| 2003/0093514 | A1* | 5/2003 | Valdes et al. | 709/224 |
| 2003/0101260 | A1* | 5/2003 | Dacier et al. | 709/224 |
| 2003/0108042 | A1* | 6/2003 | Skillicorn et al. | 370/389 |
| 2003/0110398 | A1* | 6/2003 | Dacier et al. | 713/201 |
| 2004/0044912 | A1* | 3/2004 | Connary et al. | 713/201 |
| 2004/0088583 | A1* | 5/2004 | Yoon et al. | 713/201 |
| 2004/0103021 | A1* | 5/2004 | Scarfe et al. | 705/13 |
| 2004/0117478 | A1* | 6/2004 | Triulzi et al. | 709/224 |
| 2004/0260945 | A1* | 12/2004 | Raikar et al. | 713/201 |
| 2005/0086529 | A1* | 4/2005 | Buchsbaum | 713/201 |

OTHER PUBLICATIONS

Yoann Padioleau et al., "A Logic File System", Proceedings of the 2003 Usenix Annual Technical Conference, Online! URL:http://www.usenix.org/events/usenix03/tech/full-papers/padioleau/padioleau.pdf, Jun. 9, 2003-Jun. 14, 2003.

Debar et al., "A Revised Taxonomy for Intrusion-Detection Systems", Annals of Telecommunications, Presses Polytechniques et Universitaires Romandes, Lausanne, CH, vol. 55, No. 7/8, Jul. 2000, pp. 361-378.

Ulf Lindquist et al., "How to Systematically Classify Computer Security Intrusions", Proceedings of the 21st National Information Systems Security Conference, Online! URL: http://www.ce.chalmers.se/old/staff/ulfl/pubs/sp97ul.pdf, May 4, 1997, pp. 154-163.

* cited by examiner

| Sig. Id | Documentation |
|---|---|
| 1739 | WEB-PHP DNSTools administror authentication bypass attempt |
| 1740 | WEB-PHP DNSTools authentication bypass attempt |
| 1741 | WEB-PHP DNSTools access |
| 803 | WEB-CGI HyperSeek hsx.cgi directory traversal attempt |
| 1076 | WEB-IIS repost.asp access |
| 1110 | WEB-MISC apache source.asp file access |
| 340 | FTP EXPLOIT overflow |
| 1247 | WEB-FRONTPAGE rad overflow attempt |

METHOD OF MANAGING ALERTS ISSUED BY INTRUSION DETECTION SENSORS OF AN INFORMATION SECURITY SYSTEM

RELATED APPLICATIONS

This is a U.S. National Phase Application under 35 USC 371 of International Application No. PCT/FR2004/003252, filed on 16 Dec. 2004.

BACKGROUND OF THE INVENTION

The invention relates to a method of managing alerts issued by intrusion detection sensors.

The security of information systems relies on the deployment of intrusion detection systems (IDS) including intrusion detection sensors that send alerts to alert management systems.

Intrusion detection sensors are active components of the intrusion detector system that analyze one or more sources of data for events characteristic of an intrusive activity and send alerts to an alert management system that centralizes the alerts from the various sensors and optionally analyzes all the alerts.

Intrusion detection sensors generate a very large number of alerts, possibly several thousand alerts a day, as a function of the configuration and the environment.

The surplus alerts may result from a combination of several phenomena. First of all, false alerts represent up to 90% of the total number of alerts. Secondly, it is often the case that alerts are too "granular", i.e. that their semantic content is highly impoverished. Finally, alerts are often repetitive and redundant.

The surplus alerts therefore make it difficult for a human security operator to understand them and manipulate them.

To facilitate analysis by a security operator, it is therefore necessary to process alerts upstream of the management system.

Existing alert management systems store the alerts in a relational database management system (RDBMS). The security operator can interrogate the RDBMS by submitting to it a request relating to the properties of the alerts. The RDBMS responds by supplying to the operator all the alerts whose description matches the request.

The drawback of those systems is that many granular alerts may be supplied to the operator, which makes analyzing them a painstaking task.

OBJECT AND SUMMARY OF THE INVENTION

An object of the invention is to eliminate the above drawbacks and to provide a simple method of managing alerts issued by intrusion detection sensors to enable flexible, easy, and fast consultation of the alerts.

The above objects are achieved by a method of managing alerts issued by intrusion detection sensors of an information security system including an alert management system, each alert being defined by an alert identifier and an alert content, which method is characterized in that it includes the following steps:

associating with each of the alerts issued by the intrusion detection sensors a description including a conjunction of valued attributes belonging to attribute domains;

organizing the valued attributes belonging to each attribute domain into a taxonomic structure defining generalization relationships between said valued attributes, the plurality of attribute domains thus forming a plurality of taxonomic structures;

completing the description of each of said alerts with sets of values induced by the taxonomic structures on the basis of the valued attributes of said alerts to form complete alerts; and storing said complete alerts in a logic file system to enable them to be consulted.

Thus storing complete alerts in a logic file system enables a security operator to consult the alert management system efficiently, quickly, and flexibly, in order to obtain a precise view of all the alerts issued by the intrusion detection sensors.

Complete alerts may be consulted by successively interrogating and/or browsing said complete alerts so that the alert management system responds to a request by supplying pertinent valued attributes enabling a subset of complete alerts to be distinguished in a set of complete alerts satisfying the request in order to enable said request to be refined.

The pertinent valued attributes assigned the highest priority are preferably those that are most general, given the taxonomic structures.

The alert management system advantageously further responds to the request by supplying alert identifiers satisfying the request and whose description cannot be refined with respect to said request.

The alert identifier is a pair consisting of an identifier of the intrusion detection sensor that produces the alert and an alert serial number assigned by said sensor.

The content of each alert includes a text message supplied by the corresponding intrusion detection sensor.

Each valued attribute includes an attribute identifier and an attribute value.

According to one aspect of the invention, each attribute identifier is associated with one of the following attribute domains: attack domain, attacker identity domain, victim identity domain, and attack date domain.

The description of a given alert is advantageously completed by recovering recursively from generalization relationships of the taxonomic structures a set including the more general valued attributes not already included in the description of another alert completed previously.

According to one particular aspect of the invention, the valued attributes in the taxonomic structure are organized in accordance with an acyclic directed graph.

The invention also provides a computer program designed to execute the above method when it is executed by the alert management system.

BRIEF DESCRIPTION OF THE DRAWINGS

Other features and advantages of the invention will emerge on reading the description given below by way of illustrative and non-limiting example and with reference to the appended drawings, in which.

DETAILED DESCRIPTION OF EMBODIMENTS OF THE INVENTION

Figure 1:
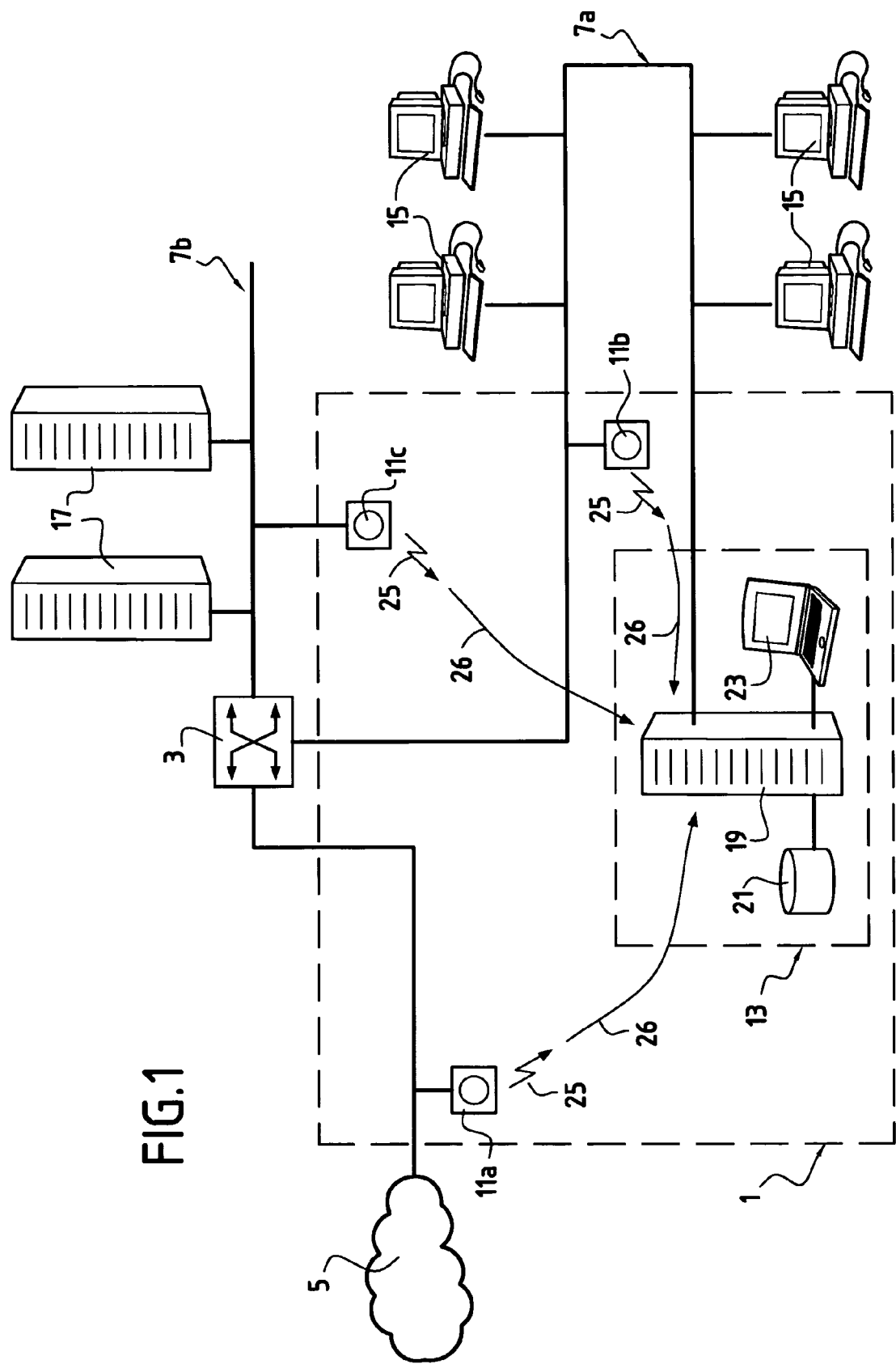
FIG. 1 is a diagram of an information security system including an alert management system of the invention.

FIG. 1 shows one example of an intrusion detection system 1 connected via a router 3 to an external network 5 and to a distributed architecture internal network 7a, 7b.

The intrusion detection system 1 includes intrusion detection sensors 11a, 11b, 11c and an alert management system 13. A first intrusion detection sensor 11a monitors alerts coming from outside, a second intrusion detection sensor 11b monitors a portion 7a of the internal network comprising workstations 15, and the third intrusion detection sensor 11c monitors another portion 7b of the internal network comprising servers 17 supplying information to the external network 5.

The alert management system 13 includes a host 19 dedicated to processing alerts, a database 21, and an output unit 23.

The logic file system may be of the LISFS type proposed by Padioleau and Ridoux in their paper "A Logic File System", Usenix Annual Technical Conference 2003.

In the LISFS logic system, files are objects associated with descriptions expressed in the form of propositional logic. The description of a file is a conjunction of properties.

The properties of the files are the directories of the file system and the path of a file is therefore its description. A path is therefore a logic formula. A location in the file system contains all the files whose description satisfies the formula corresponding to the path of the location.

As in a conventional file system, specific commands are used to browse and manipulate files and their descriptions.

As indicated by the arrows 26, the sensors 11a, 11b 11c of the intrusion detection system 1 send alerts 25 to the alert management system 13 which, in accordance with the logic file system 21 to enable flexible consultation thereof via the output unit 23.

The host 19 of the alert management system 13 comprises processor means for managing alerts in this way.

Figure 2:
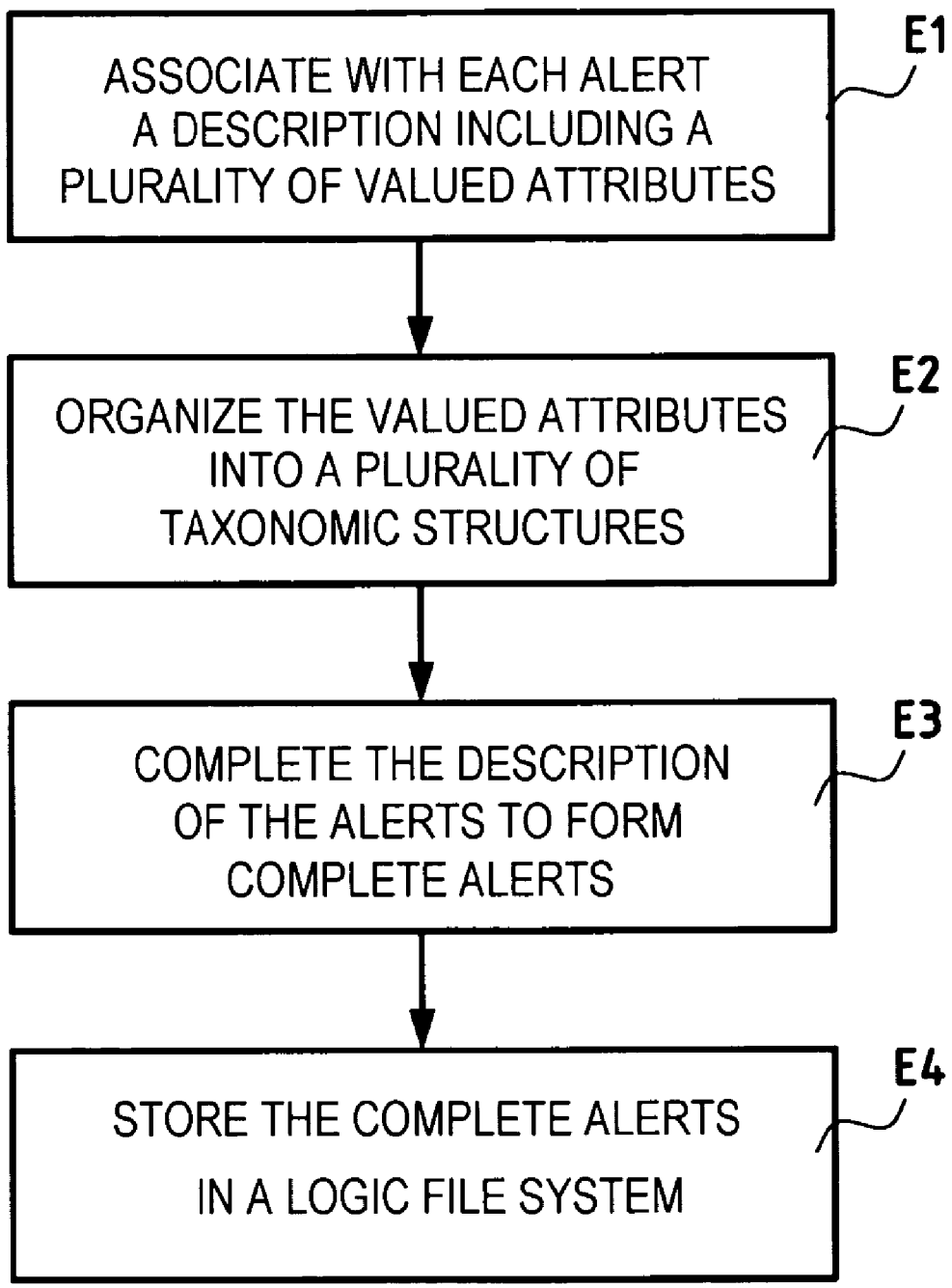
FIG. 2 is a flowchart showing the steps of the method of the invention of managing alerts.

The alert management system may execute a computer program designed to implement the present invention. FIG. 2 is a flowchart showing the steps of the method of the invention for managing a set O of alerts issued by intrusion detection sensors.

Each alert $\underline{o}$ of this set of alerts is defined by an alert identifier and an alert content.

An alert $o \in O$ can be defined by a single alert identifier id(o) given by a pair (s,n) in which $\underline{s}$ is the serial identifier of the intursion detection sensor that produces the alert and $\underline{n}$ is the alert serial number assigned by that sensor to the alert $\underline{o}$.

The content $m_o$ of the alert $\underline{o}$ includes a text message addressed to the security operator and supplied by the intrusion detection sensor that produced the alert.

A step E1 associates with each of the alerts issued by the intrusion detection sensors 11a, 11b, 11c a description d(o) including a conjunction of a plurality of valued attributes $\{d_{o,i}\}$ belonging to a plurality or a set of attribute domains $\{A\}$.

Thus a description d(o) of an alert is a conjunction of $\underline{p}$ valued attributes, i.e. $d(o) = d_{o,1} \char94 \ldots \char94 d_{o,p}$.

A valued attribute $d_{o,i}$ is a pair (a,v) comprising an attribute identifier a and an attribute value v.

Each attribute identifier $\underline{a}$ is associated with an attribute domain A from the following domains: attack domain, attacker identity domain, victim identity domain, and attack date domain.

Generally speaking, an attribute domain A is formed of a discrete set having a partial order relationship $\prec_A$ defining the domain of the valued attribute $d_{o,i}$.

A step E2 organizes the valued attributes $d_{o,i}$ belonging to each attribute domain A into a taxonomic structure defining generalization (or specialization) relationships between those valued attributes. There is a taxonomy for each attribute domain. Thus the plurality of attribute domains forms a plurality of taxonomic structures.

The generic taxonomic structure of the valued attributes is an acyclic directed graph.

The taxonomic relationships are modeled by axioms. Accordingly, a valued attribute $\underline{d}$ more specific than another valued attribute d' is modeled by an axiom d|=d', i.e. the valued attribute d' is a logical consequence of the valued attribute $\underline{d}$. In other words, an alert that has the specific valued attribute $\underline{d}$ automatically has the less specific valued attribute d'.

A step E3 completes the description of each of the alerts issued by the intrusion detection sensors 11a, 11b, 11c with sets of values induced by the taxonomic structures based on the valued attributes of those initial alerts to form complete alerts.

The valued attributes of the alerts produced by the intrusion detection sensors are the most specific of the taxonomies.

Accordingly, on receiving a given alert, the alert management system 13 can, for example, complete the description of that alert by recursively recovering from the generalization relationships of the taxonomic structures a set including the more general valued attributes that have not already been included in the description of another alert previously completed.

In other words, the description of a given alert is completed by a process that consists in working back through a given taxonomy starting from a given valued attribute. If a valued attribute exists already in the description of another alert processed previously, then this process is stopped; if not, it is added, and the process is iterated from this added valued attribute.

There follows an example of an algorithm "CompleteDescription" describing a process for completing the description of an alert.

| CompleteDescription |
| --- |
| if there is no $d_{o,i}$ do<br>    D = $\{d'_{o,i} : d_{o,i} \models d'_{o,i}\}$<br>    for each $d'_{o,i} \in D$ do<br>        CompleteDescription ($d'_{o,i}$)<br>    do<br>        mkdir $d'_{o,i}/\ldots/d'_{o,n}$<br>do |

This algorithm first tests the existence of a given valued attribute $d_{o,i}$. If that attribute $d_{o,i}$ does not exist, the set D= $\{d'_{o,i} : d_{o,i} \models d'_{o,i}\}$ of valued attributes that are more abstract, given the taxonomies, is recovered. Then, for each element $d'_{o,i}$ belonging to D, the CompleteDescription algorithm is called recursively. At the end, the valued attribute is added to the alert management system by the command "mkdir" of the LISFS logic file system.

Finally, a step E4 in FIG. 2 stores the alerts completed in the preceding step in the logic file system 21 to enable them to be consulted.

Below is an example of a "StoreAlert" algorithm describing a process for storing a new alert in an LISFS logic file system.

---
StoreAlert
---
For each $d_{o,i}$ do
    CompleteDescription ($d_{o,i}$)
do
cp $m_o d_{o,i}/\cdots/d_{o,n}/a$

---

For each description element $d_{o,i}$ the above algorithm completes a given alert o iteratively by calling the "CompleteDescription" algorithm described above.

When all the description elements of the given alert have been completed, the complete alert and its content are stored by a store command "cp" with parameters consisting of the alert content $m_o$, the alert description $d_{o,1}/\ldots/d_{o,n}$, and the alert identifier a.

Storing the complete alerts in the logic file system 21 enables them to be consulted and/or browsed successively in the set of complete alerts.

Accordingly, in response to a request from a security operator, and in order to refine the request, the alert management system 13 supplies pertinent valued attributes for distinguishing a subset of complete alerts in a set of complete alerts satisfying the request.

A request from the security operator is a logic formula f which combines conjugations (AND) ^, disjunctions (OR) ∨, and negations (NOT) ¬ of valued attributes.

Generally speaking, the description d(o) of an alert o satisfies a request f if the request f is a logical consequence of the description d(o). The set of alerts satisfying the request f, called the extension of f, is therefore ext(f)={o ∈O: d(o)|=f}.

The set A of pertinent valued attributes is the set of valued attributes belonging to valued attribute domains A, such that for any pertinent valued attribute p of A, the set of complete alerts satisfying the conjunction of the current request f with the pertinent valued attribute p is strictly contained in the set of complete alerts satisfying the current request f. Accordingly, this set A of pertinent valued attributes enabling alerts to be distinguished from each other can be defined as follows:

A={p∈A: Φ ⊂ ext(f ^ p) ⊂ ext(f)}.

The set A may be considered as a set of browsing links by defining each pertinent value attribute p as a browsing link. The security operator can therefore refine a current request f by choosing a browsing link p ∈A supplied by the alert management system 13. The current request f from the security operator is thus transformed into a new request f ^ p.

To reduce further the number of responses, the alert management system 13 advantageously gives priority to supplying the pertinent valued attributes that are the most general in regard to the plurality of taxonomic structures.

The set $A_{max}$ of the most general pertinent valued attributes is then given by the set $\max_{|=}(A)$, which may be defined as follows:

$\max_{|=}(A)$={p∈A: there exists no p'∈A,p'≠p,p |=p'}.

Accordingly, this set $\max_{|=}(A)$ is the set of all pertinent valued attributes p of A that do not have a more general valued attribute.

Moreover, in response to the current request f, the alert management system supplies a set O of alert identifiers the description whereof satisfies the current request f and cannot be refined, i.e. described more precisely, with respect to that request f. Accordingly, the set O of alert identifiers includes all alert identifiers whose description satisfies the current request f and such that there exists no pertinent valued attribute p such that the conjunction of f and p is satisfied by the description of that same alert. Accordingly, the set O can be defined as follows:

O={id(o): o∈O, d(o)|=f , and there exists no p ∈A with d(o)|=f ^ p }.

Note that the logic file system 21 (e.g. the LISFS file system) provides commands for browsing objects (command "cd"), interrogating objects (command "ls") and storing objects (commands "cp" and "mkdir").

For example, in LISFS, a request that retrieves alerts whose victim is a web proxy and whose attacker is not internal is expressed as follows:

ls/"web proxy victim"/! "internal attacker".

Generally speaking, an alert coming from an intrusion detection sensor is a set of four valued attributes: attack, attacker, victim, and date.

The domain of the attack valued attribute consists of the identifiers of attack signatures in alerts generated by the intrusion detection sensors 11a, 11b, 11c.

The domain of the attack valued attribute also includes any vulnerabilities exploited by an attack. These vulnerabilities are more abstract, i.e. more general, than the attack identifiers.

The other values used to qualify the attacks are produced from keywords employed to qualify the attacks in the documentation of the intrusion detection sensors 11a, 11b, 11c.

Consider, by way of example, the Snort™ sensor and the "msg" field of the signature documentation.

Figures 3A, 3B:
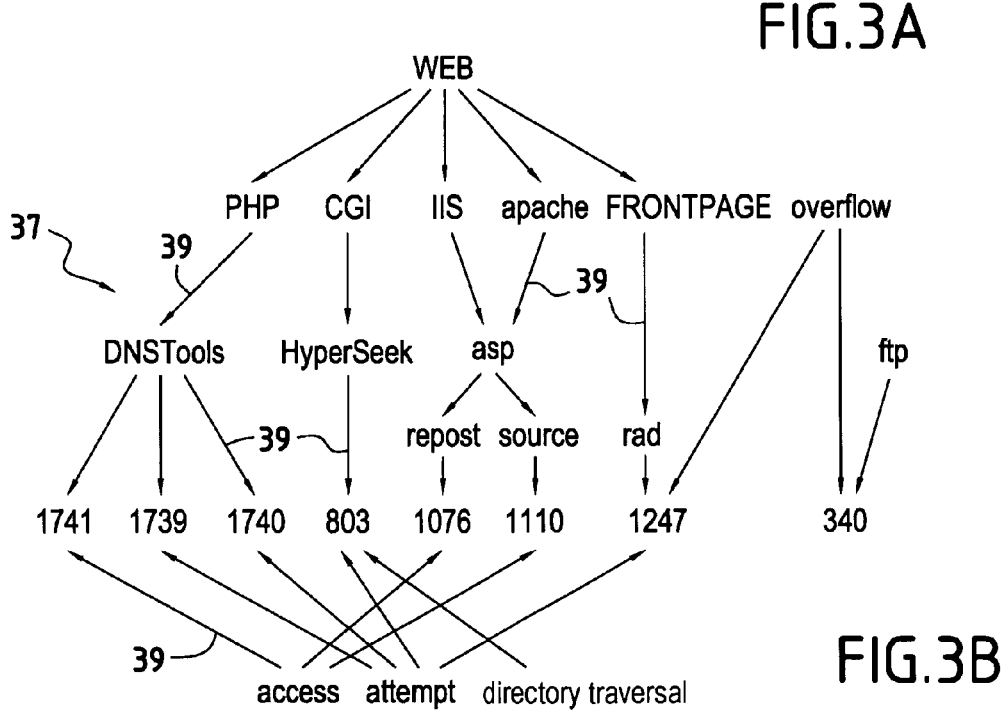
FIG. 3A shows one example of documentation associated with attack signatures.
FIG. 3B is a diagram of a taxonomic structure associated with the FIG. 3A example.

FIG. 3A shows an example of documentation associated with attack signatures.

Column 31 of table 33 includes integers designating attack signatures. Column 35 of table 33 includes documentations associated with those attack signatures. Accordingly, each row of table 33 contains documentation associated with each attack signature. Each description includes keywords relating to the type of attack, the network protocol used, and the success or failure of the attack, for example.

FIG. 3B shows a taxonomic structure 37 defining relationships 39 of generalization between the valued attributes contained in the table 33. The taxonomic structure 37 is organized according to expert knowledge on the basis of the keywords of the documentation of the signatures in the table 33. Note that the attack signatures 31 constitute the most specific valued attributes.

The domain of the attackers valued attribute includes IP addresses. External IP addresses can be generalized by the name of the proprietor organization of the range of IP addresses to which the address belongs. The name of the organization corresponds to the field "netname" contained in the databases of the IANA™, which is the organization which oversees IP address assignment.

Internal IP addresses and private (non-routable) IP addresses can be generalized in the form of local network identifiers defined by an administrator of the intrusion detection system 1.

Finally, the names of the organizations can be generalized in the form of the value "ext" and the identifiers of the local networks can be generalized in the form of the value "int".

The domain of the victim valued attribute includes IP addresses. These IP addresses of victims can be generalized in the form of the address of the corresponding local area network.

These IP addresses can also be generalized in the form of machine names obtained by name resolution mechanisms. The machine names can be generalized in the form of host "functions" (for example the web server function) defined by the site administrator. The machine names can be generalized in the form of local area network identifiers (for example DMZ) defined by the network administrator.

The domain of the date valued attribute includes the date and time of the alerts in the format DD-MM-YYYY hh:mm:ss. The dates are successively generalized in the form minute, hour, day, month, year. These generalizations finally correspond to increasingly coarse abstractions of the time and date of an attack.

The invention claimed is:

1. A method of managing alerts issued by intrusion detection sensors of an information security system including an alert management system, each alert being defined by an alert identifier and an alert content, the method comprising:
   associating with each of the alerts issued by the intrusion detection sensors a description including a conjunction of valued attributes belonging to attribute domains;
   organizing the valued attributes belonging to each attribute domain into a taxonomic structure defining generalization relationships between said valued attributes, a plurality of attribute domains forming a plurality of taxonomic structures;
   completing the description of each of said alerts with sets of generalized valued attributes induced by the taxonomic structures based on the valued attributes of said alerts to form complete alerts;
   storing said complete alerts in a logic file system to enable said complete alerts to be consulted; and
   consulting the complete alerts by at least one of successively interrogating and browsing said complete alerts so that the alert management system responds to a request by supplying pertinent valued attributes enabling a subset of complete alerts to be distinguished in a set of complete alerts satisfying the request to enable said request to be refined, said request being a logic formula of at least one of said valued attributes;
   wherein each complete alert is saved in the logic file system as a file with a completed description of each complete alert expressed using propositional logic.

2. The method according to claim 1, wherein the pertinent valued attributes assigned a highest priority are those that are most general, given the taxonomic structures.

3. The method according to claim 1, wherein the alert management system further responds to the request by supplying alert identifiers satisfying the request and whose description cannot be refined with respect to said request.

4. The method according to claim 1, wherein the alert identifier is a pair consisting of an identifier of the intrusion detection sensor that produces the alert and an alert serial number assigned by said intrusion detection sensor.

5. The method according to claim 1, wherein the content of each alert includes a text message supplied by a corresponding intrusion detection sensor.

6. The method according to claim 1, wherein each valued attribute includes an attribute identifier and an attribute value.

7. The method according to claim 6, wherein each attribute identifier is associated with one of the following attribute domains: attack domain, attacker identity domain, victim identity domain and attack date domain.

8. The method according to claim 1, wherein the description of a given alert is completed by recovering, recursively from generalization relationships of the taxonomic structures, a set including more general valued attributes not already included in the description of another alert completed previously.

9. The method according to claim 1, wherein the valued attributes in the taxonomic structure are organized in accordance with an acyclic directed graph.

10. Alert management system for managing alerts issued by intrusion detection sensors, each alert being defined by an alert identifier and an alert content, the system comprising:
    processor means for associating with each of the alerts issued by the intrusion detection sensors a description including a conjunction of valued attributes belonging to attribute domains;
    processor means for organizing the valued attributes belonging to each attribute domain into a taxonomic structure defining generalization relationships between said valued attributes, a plurality of attribute domains forming a plurality of taxonomic structures;
    processor means for completing the description of each of said alerts with sets of generalized valued attributes induced by the taxonomic structures based on the valued attributes of said alerts to form complete alerts;
    processor means for storing said complete alerts in a logic file system to enable said complete alerts to be consulted; and
    processor means for consulting the complete alerts by at least one of successively interrogating and browsing said complete alerts so that the alert management system responds to a request by supplying pertinent valued attributes enabling a subset of complete alerts to be distinguished in a set of complete alerts satisfying the request to enable said request to be refined, said request being a logic formula of at least one of said valued attributes;
    wherein each complete alert is saved in the logic file system as a file with a completed description of each complete alert expressed using propositional logic.

11. Information security system comprising intrusion detection sensors and the alert management system according to claim 10.

* * * * *